United States Patent [19]

Barto, Jr. et al.

[11] Patent Number: 4,590,578
[45] Date of Patent: May 20, 1986

[54] OFF-LINE PROGRAMMABLE ROBOT

[75] Inventors: John J. Barto, Jr., Cheshire; Peter M. Walsh, So. Windsor; Peter R. Fitzpatrick, Glastonbury; Richard F. Dondero, So. Meriden; Kenneth P. Demers, W. Hartford; Stephen M. Gardner, Enfield, all of Conn.

[73] Assignee: United Technologies Corporation, Hartford, Conn.

[21] Appl. No.: 512,829

[22] Filed: Jul. 11, 1983

[51] Int. Cl.$^4$ .................................... G06F 15/46
[52] U.S. Cl. .................................... 364/513; 364/167; 364/191; 364/571; 318/632; 901/3; 901/33; 901/35; 901/47
[58] Field of Search ............... 364/513, 167, 191, 192, 364/193, 571; 318/568, 632; 901/2, 3, 5, 6, 8-10, 14, 16, 30, 33, 35, 46, 47

[56] References Cited

U.S. PATENT DOCUMENTS

| | | | |
|---|---|---|---|
| 3,920,972 | 11/1975 | Corwin, Jr. et al. | 364/513 |
| 4,338,672 | 7/1982 | Perzley et al. | 364/513 |
| 4,362,977 | 12/1982 | Evans et al. | 901/9 X |
| 4,382,215 | 5/1983 | Barlow et al. | 318/568 |
| 4,429,266 | 1/1984 | Tradt | 318/568 |
| 4,453,085 | 6/1984 | Pryor | 901/47 X |
| 4,481,592 | 11/1984 | Jacobs et al. | 364/513 |

OTHER PUBLICATIONS

"An Off-Line Programming Approach", R. L. Tarvin, Robotics Today, Summer 1981, pp. 30-35.
"Robotic Drilling and Riveting Using Computer Vision", R. C. Movich, Robots V Conference, Oct. 1980.

Primary Examiner—Jerry Smith
Assistant Examiner—John R. Lastova
Attorney, Agent, or Firm—Gerald E. Linden

[57] ABSTRACT

Machine operations are performed by a robot at a plurality of locations on a workpiece based on off-line data. The off-line data is corrected based on two levels of workpiece/robot alignment. First the robot determines the orientation of a fixture to which the workpiece is mounted by "touching-off" on known reference points (touchblocks) on the fixture. Coordinate data for the location of local features on the workpiece is corrected based on the first level of alignment and the positions of the local features are then sensed to provide a coordinate transformation for subsequent application to nominal machine operation location coordinates. The local features may be preassembly rivets and provide for individualized robot response on a workpiece-by-workpiece basis.

3 Claims, 2 Drawing Figures

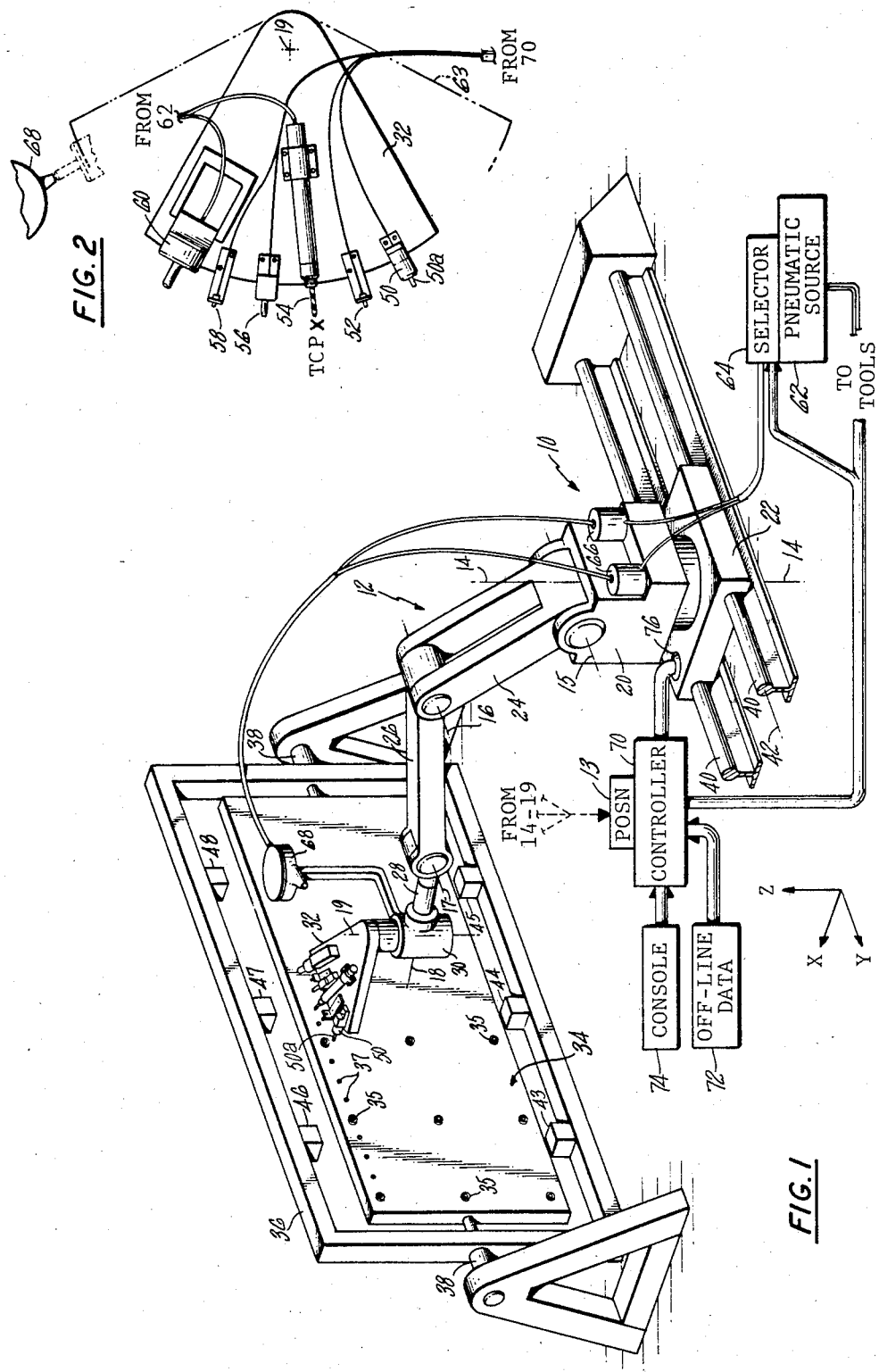

OFF-LINE PROGRAMMABLE ROBOT

DESCRIPTION

1. Technical Field

This invention relates to robotics and, more particularly, to off-line programming of a robot.

2. Background Art

A robot is a reprogrammable, multifunctional manipulator designed to move material, parts, tools or specialized devices through variable, programmed motions for the performance of a variety of tasks. An articulated robot has a base and an arm with several axes of motion terminating in a tool plate. The position of the tool plate defines a tool center point (TCP) that determines the location of a machine operation. Due to the many axes and arm length involved, the actual TCP position may vary substantially from its predicted position over the work envelope of the robot. Therefore, a scheme is required to provide for accurate TCP positioning relative to a workpiece.

Typically, a robot is "taught" a set of points, manually, by directing the arm to a series of known points with a teach pendant. (see *Design News,* Mar. 28, 1983, p.70) This is "on-line" programming. The robot is then commanded to return to the taught set of points. Repeatability relates to the ability for the robot to return to a taught point and may be adversely affected by factors such as not returning to the taught point via the same path and at the same speed each time. In the teach mode, points may be taught directly from marked points on the workpiece or from a bonnet affixed thereto. In either case, teaching can be very laborious and may comprise the major time-consuming task in a robotic operation. This is especially true with regard to aircraft manufacture, where hundreds and thousands of holes and rivets must be drilled and placed. It is redundant for a robot operator to teach points which may already exist on a data base. Furthermore, any change in the point configuration, however slight, requires a time-consuming teaching task.

A bonnet may be used during the operational mode to enhance accurate hole placement in the workpiece. The bonnet overlays the workpiece, and has holes accurately disposed therein, which holes may be reinforced with hardened collars, to guide a tool, such as a drill, to specified locations on the workpiece. Any change in the hole configuration requires modification or refabrication of the bonnet.

It is also known to enhance accuracy by locating the workpiece accurately relative to the robot, i.e. "hard-fixturing". The workpiece may accurately be mounted in a fixture, in a straightforward manner. Then the fixture is located accurately relative to the robot. During setup, the robot arm may be extended in a known manner to aid in the exact location of the fixture (See, *American Metal Market/Metalworking News,* Jan. 24, 1983, p.8). With this scheme some reteaching may be necessary on a per-part basis. Once the relationship between the robot and the fixture is established, the robot either moves the tool to successive points on the workpiece, or moves the workpiece to successive orientations relative to the stationary tool (See, *Robotics World,* January 1983, p. 40).

Repeatability is a problem where more than one machine operation is required at a point, such as drilling and riveting. Therefore, it is known to provide a turret at the toolhead, carrying two or more tools. Thereby, the arm can remain stationary, said stability being enhanced by brakes on the axes, while the turret presents a sequence of tools to the workpiece. (See, *Aviation Week & Space Technology,* Aug. 2, 1982, p. 93). Obviously, such an approach is inapposite in certain situations, such as when disassembly and deburring between drilling and riveting is required.

"Off-line" programming involves commanding a robot to points in space through remotely generated data rather than teaching those points. While eliminating the drawbacks of the teaching task, off-line programming has its own peculiar set of problems. For instance, whereas repeatability is the key to on-line programming, it is only one of many factors affecting robot accuracy, which is the bane of off-line programming. Robot accuracy refers to the ability of the robot to go to a point that is commanded, rather than taught. Tool weight, repeatability, configuration for a given point, and mechanical resolution are some of the factors that affect this ability. Absolutes assume a primary role in the robot's ability to go where directed. For a discussion of off-line programing generally, see *Robotics Today,* Summer 1981, pgs. 30-35.

Many variables contribute to the difficulty of achieving accuracy, such as the generic situation in which parts are not of expected size, shape or location. Present research issues involve formulation of effective algorithms, identification of necessary applications, and a better appreciation of what range of experience one may expect a robot to work within and recover from. In present industrial robots that range is zero. (See, *Iron Age,* Apr. 22, 1983, p. 55.)

While extending the robot's work envelope, an ability for a robot to move, such as along a track aggravates the accuracy problem. This is especially poignant in aircraft manufacture where the work envelope of the robot may be small as compared to the size of a typical workpiece, such as an airfoil.

Another challenge to off-line programming is the tight tolerances required in aircraft manufacture. For instance, a skin may be riveted to an infrastructure that has "ribs". For weight considerations, it is desirable to minimize the width of the rivet-receiving portion (flange) of the ribs while, at the same time maintaining at least a minimum edge-distance between the rivet hole and the edge of the flange for structural integrity. Clearly, flange width must be maintained for the worst case. An ability for the robot to place rivets automatically by direct reference to the infrastructure would be extremely useful, but is ofttimes impractical. The problems of off-line programming are also augmented by the pronounced curvature common to many aircraft components.

DISCLOSURE OF INVENTION

Therefore, it is an object of this invention to provide for off-line programming of a robot. It is another object to provide a robot that is adaptable to workpiece location relative to the robot or to part-to-part configuration. It is a further object to enhance robot accuracy while providing for mobility in a greatly augmented work envelope. It is a still further object to eliminate robot accuracy as the limiting factor in certain design considerations, such as the required width of infrastructure flanges. It is another object to significantly reduce overall task time and to facilitate task changes.

According to the invention, a workpiece is mounted to a fixture and located within a robot's work envelope. Based on off-line (stored) data the robot automatically "touches off" on the fixture to determine the gross orientation and displacement of the workpiece. Based on that data, a coordinate transformation is determined which is applied to stored coordinates which define the locations on the workpiece for local features. The position of the local features on the workpiece is then measured to compensate for robot inaccuracies and to compensate for changes/corrections made during the preassembly stage. Based on the data gathered by local feature measurement, a second coordinate transformation is determined for correction of stored machine operation location coordinates to direct robotic operation.

The foregoing and other objects, features and advantages of the present invention will become more apparent in the light of the following detailed description of an exemplary embodiment thereof.

BRIEF DESCRIPTION OF THE DRAWINGS

FIG. 1 is a perspective view of the robot of this invention, partly diagrammatic, poised to perform an operation on a workpiece.

FIG. 2 is a detailed view of the robot tool plate.

BEST MODE FOR CARRYING OUT THE INVENTION

In FIG. 1 is shown a robot 10, such as an ASEA IRb-60, having an articulated arm 12 and several axes 14–19 for motion.

A first axis 14 allows for rotation of a section 20 relative to a base 22. A second axis 15 allows for pivoting of a first link 24 relative to the section 20. A third axis 16 allows for pivoting of a second link 26 relative to the first link 24. A fourth axis 17 allows for pivoting of a third link 28 relative to the second link 26 and a fifth axis 18 allows for rotation therebetween. A position motor 30 is attached to the third link 28 and is operable to position a toolplate 32. This establishes a sixth axis 19. A position sensor 13, such as a resolver, is associated with each of the six axes 14–19 and is operable to provide a signal indicative of the configuration of the arm 12, and more particularly of the position of a selected point such as a Tool Center Point (TCP), which signal may be processed to provide coordinates, in an orthagonal (xyz) frame of reference associated with the robot 10. On the toolplate 32 are disposed a plurality of tools for performing maching operations on a workpiece 34, such as a horizontal stabilator for a helicopter.

In FIG. 2, the toolplate 32 is shown with a plurality of tools mounted thereon. They are a touch probe (sensor) 50, an optical sensor 52, a drill 54, a sealant applicator 56, an optical sensor 58, and a riveter 60. The touch probe 50, such as a Renishaw probe, is operable to provide a signal to the controller 70 whenever a pointer 50a comes into contact with an object, i.e. is displaced. The tool plate 32 is movable about the sixth axis 19 within a range of positions that is shown by a broken line 63 so that each tool may selectively be located at the tool center point (TCP). (In the alternative, a separate TCP can be defined for each tool.) The drill 54 is shown positioned at the TCP. The sequential selective operation of the tools in the context of a typical drilling/riveting sequence, is discussed hereinafter.

With reference again to FIG. 1, the workpiece 34 is mounted to a fixture 36 in a straightforward accurate manner. The fixture 36 is rotatable on pivots 38,38 so that faces of the workpiece 34 may be presented (shuttled) alternately to the robot and to a human operator who is outside of the work envelope and is mounted near the robot so that the workpiece 34, or at least part of it, is within the robot's work envelope. Since a portion of the workpiece 34 may not be within the robot's limited work envelope, the robot 10 is mounted on a carriage track 40 that allows the robot 10 to move along a seventh axis 42 to reach various portions of the workpiece, i.e. to travel to a plurality of workstations. The robot's position along the track 40 is easily measured to provide an offset to positional data and commands.

A plurality of touchblocks 43–48 are disposed on the fixture 36 and correspond to the plurality of workstations. The relationship of the workpiece to the touchblocks is known and precise. Each block may be a cube and is oriented such that a face of each touchblock faces the robot when the fixture is mounted. In other words, each touchblock has faces substantially normal to the robot orthogonal axes (x,y,z). The importance of this feature will become apparent hereinafter.

The known offsets between the workpiece 34, the fixture 36, the touchblocks 43–48, the track 40 and the robot 10, in conjunction with data specifying the location and orientation of the workpiece (or a plurality of locations on the workpiece), provide a nominal indication of the location and orientation of the workpiece in the robot frame of reference. However, in practice, uncertainties, such as in determining the actual TCP position in the robot frame of reference, dictate an experimental ("on the fly") determination of the positional relationship of the workpiece to the robot in order to maintain accuracy in the location of machine operations on the workpiece. The need for such a scheme is essential to this invention and is especially poignant in the context of a highly articulated robot that is movable on a track.

As a first step towards achieving accuracy, it is absolutely essential that the robot "know" the location of the TCP, in its own frame of reference, for all configurations of the articulated arm 12 since the "business end" of each of the tools is located at, or at a known position relative to the TCP. Although nominal robot parameters such as link lengths are known, the deviation from the expected TCP position over the length and travel of the arm 12 can be substantial, and the controlling factor in accuracy if not accounted for. Therefore, the robot is initially calibrated. This may be performed experimentally by moving the TCP to various known points in space, collecting measurement data, and providing a more accurate representation of the robot by identifying the values of parameters in its model. A "Method and Apparatus for Calibrating a Robot to Compensate for Inaccuracy of the Robot" is described in U.S. Pat. No. 4,362,977 (Evans, 1982). The robot of the aforementioned Evans patent is a 3-axis rectilinear robot working within a closed work envelope (i.e., within its own frame) and a few measurement touches provide sufficient data for calibration.

In the context of a highly articulated, large robot, such as the ASEA IRb-60 working in an open work envelope, a sophisticated calibration scheme is required to insure predictable TCP positioning. One such scheme is disclosed in *Robotics Today,* Summer 1981 Pp 30–35. That scheme comprises using a grid and various measuring tools, moving the arm manually from grid point to grid point along a reference axis, and collecting data at each point to map errors. Any of a number of schemes, known in the art, could be used to calibrate the robot. It should be understood that the calibration scheme should be performed initially to calibrate the robot 10, but is only performed on an "as-needed" basis thereafter to compensate for accumulated system error.

Once calibrated, it is necessary to align the robot—in other words, to establish the relationship between the robot 10 and the workpiece 34. One scheme involves taking the robot by the "hand" and pointing it to certain known points on the fixture and collecting data for a transformation matrix and an offset vector. Once the vector and matrix values are determined, they can be stored in the controller for use in converting data from the workpiece coordinate system into the robot coordinate system. (See *Robotics Today*, Summer 1981, p.34).

An automatic alignment procedure, particularly well suited to this invention, is disclosed in copending U.S. application Ser. No. 512,828 filed on even date herewith, entitled ROBOT/WORKPIECE ORIENTATION, which is incorporated herein by reference. Said procedure capitalized on features such as the touchblocks being large (i.e., surfaces, not points) and minimizing the adverse effects of inherent robot inaccuracies. A general description of that procedure is incorporated in the following description of the alignment sequence.

A computer controller (signal processing means) 70 such as a DEC LSI-11/23, controls the functions of the robot system. The robot 10 is provided with a data link 76 for receiving commands to control the position of the arm 12 and of tools and sensors affixed thereto. Off-line data 72, such as from a CAD data base, is provided to (stored in) the controller 70 and specifies nominal location coordinates which define the locations for touchblock features, the locations on the workpiece for local features, and the locations on the workpiece for machine operations. A console 74 provides operator interface for controlling the robot 10 and editing data. In response to the nominal touchblock location coordinates, the controller 70 provides commands to position the arm 12, thereby causing the touch probe 50 to contact (existentially sense) the touchblocks that correspond to a workstation. Coordinate data is then provided to the controller 70, by the position sensor 13, indicative of the measured position of the touchblocks. The measured position of the touchblocks determines a first coordinate transformation which is stored in the controller 70 for subsequent application to other nominal location coordinates, as discussed hereinafter. The measured relationship between the robot and the touchblocks is indicative of the location and orientation of the workpiece relative to the robot, since the relationship between the workpiece and the touchblocks is accurate by definition. However, since accuracy diminishes with displacement as the robot moves from a known point, it is necessary to perform localized alignment on the workpiece itself to maintain the desired accuracy for locating machine operations on the workpiece.

The robot can sense local features on the workpiece. For instance, an aircraft skin is fastened to an infrastructure with temporary fasteners 35. In an exemplary case, the temporary fasteners 35 are nutplate rivets which are of the pull-through variety and, when secured, have a hole in their center. The hole facilitates rivet location sensing with the optical sensor 52. Under automatic control, the tool plate 32 is rotated so that the hole sensor 52 is at the TCP. Nominal local feature coordinate data indicative of the position of the rivets 35 is stored in the controller 70. The first coordinate transformation is applied to the nominal local feature coordinates to provide "corrected" local feature coordinates. The controller 70 then moves the arm 12 and rotates the toolplate 32 to position the sensor 52 at the predicted location of a rivet 35 in response to the "corrected" local feature coordinates and, through the "eye" of the sensor 52, the robot 10 "looks" for the rivet 35. It is necessary to perform a search when the rivet is not at its predicted location. Known search patterns, such as square spirals, are well-suited to this purpose. When the rivet 35 is located, coordinate data indicative of the measured position of the rivet 35 is provided to the controller 70 by the position sensor 13. The difference between the measured position of the rivet 35 and its predicted location ("corrected" local feature coordinates) determines a second coordinate transformation which is stored in the controller 70 for subsequent application to the off-line data indicative of the nominal locations on the workpiece for machine operations. The second coordinate transformation is applied to the nominal machine operation coordinates to provide "corrected" machine operation coordinates. The controller 70 can then command the arm 12 to move and the toolplate 32 to rotate to position a tool to perform a machine operation at a plurality of accurate locations on the workpiece 34 in response to the "corrected" machine operation location coordinates. In a particular embodiment, for enhanced accuracy a "line" of machine operation locations may be generated by locating a rivet 35 at each end of a line, determining a coordinate transformation for each, and applying the coordinate transformations to the nominal machine operation location coordinates by continuously interpolating for intermediate points 37, the number and relative spacing of which is determined by design considerations and provided as off-line data to the controller 70. The ease with which the robot can verify and adjust at each step to enhance and maintain accuracy is an important feature of this invention. Furthermore, when a plurality of "lines" are involved, mislocation trends for the rivets can be accounted for to minimize the search time required to locate subsequent rivets.

By finding rivets the robot inaccuracies are localized. In other words, the closer you are to a known place, the smaller the error will be. Another salient feature of the rivet sensing and system architecture is that if the robot is having difficulty maintaining accuracy along a particular line, the line can be specified as two lines simply by placing another rivet between the two end rivets and redefining the line as two lines in the control software. This provides for maximum flexibility and responsiveness in the system. New lines may also be redefined for other reasons, such as the interference of the fixture with movement of the tool plate.

It should be understood that there may be an optimal distance away from the skin at which the sensor 52 is most responsive. If so, it is desirable to verify/establish the x-axis distance of the workpiece from the robot. This can easily be done by touching off on the workpiece, prior to rivet searching, with the probe 50. It should also be understood that equivalent local features and sensing means could be employed.

Since the rivets may be placed carefully (typically with a bonnet) with respect to the infrastructure, they provide handy indicia of the location of the ribs, through which the holes are drilled. A more subtle, yet highly desirable feature is achieved when the rivets are advertently offset from a nominal design location, such as to compensate for inaccuracies in the infrastructure or to accommodate minor design changes. The ability for the robot to locate, and compensate for the advertently "misplaced" rivets obviates the need for reprogramming. In other words, the off-line data indicative of the locations on the workpiece of the local features need not be altered, so long as the offsets are small. This provides for individualized system response on a workpiece-by-workpiece basis. As is apparent from the preceeding description, the system is capable of compensating for a number of inaccuracies through the experimental, "on the fly" determination of coordinate transformations. The result of this sequence of establishing and applying the transformation is that the drill and rivet locations are controlled accurately relative to local part features which are in turn accurately placed relative to the underlying structures. The accurate placement of the rivets relative to the edges of the underlying structure is the ultimate goal which this system achieves.

A typical machine sequence is described. The workpiece 34 is mounted to the fixture 36. The robot 10 is moved to a workstation and an operator initiates the alignment sequence (touchblock and choburt sensing). Based on the alignment sequence, a coordinate transformation is determined. The drill 54 is rotated into position and holes are drilled in the workpiece based on machine operation coordinates as corrected by the coordinate transformation. The robot 10 moves to another workstation and more holes are drilled. Each time the robot moves to a new workstation, the alignment sequence is repeated. When drilling is completed, the skin is dismantled, deburred and remounted. The robot returns to the first workstation. An updated coordinate transformation is generated and is applied to the original machine operation location coordinates. At each hole, the drill 54, functioning as a reamer, requalifies the hole, the toolplate 32 is rotated and a sealant applicator 56 applies sealant to the hole, and the sealant verifier (sensor) 58 is rotated into position to verify sealant application.

A pneumatic source 62, in cooperation with a selector 64 under direction of the controller 70, causes rivets from a plurality of bowl feeders 66,66 to be delivered selectively to a rivet pick-off point 68 that pivots with the member 28 so that the tool plate 32 can be rotated about the sixth axis 19 to position the riveter 60 to pick up a rivet at the pick-off point 68. The pneumatic source 62 also provides motive power to certain tools. A rivet is picked up, and the tool plate 32 rotates so that the rivet may be inserted into the holes. The reaming/sealing/verifying/riveting sequence is iterated for each hole.

It should be understood that many sequences of machine operations can be performed using the teachings of this invention. The foregoing description is presented in simplified function-achieving form and is intended to enable those skilled in the art to practice the invention. Furthermore, many of the steps described herein could be performed in a variety of ways. The cross-reference to copending, commonly owned U.S. application Ser. No. 512,828 provides steps that are particularly well suited to the system architecture. However, the invention may be implemented in various other forms, of a variety of architectural types, employing well known programming techniques. It should be understood that the touchblocks can be embodied in (unitary with) the workpiece in which case the touchblocks provide for gross alignment and the local features provide for localized highly accurate alignment. Or, the touchblocks may be unitary with the fixture. Various other embodiments and modifications as are suited to the particular use contemplated will become apparent upon examination and practice of the invention.

What is claimed is:

1. A method for accurately performing a machine operation at a plurality of locations on a workpiece with a robot that is under the direction of a controller, that comprises:

mounting the workpiece in a predetermined manner to a fixture;

providing a plurality of alignment points on the fixture;

positioning the robot to measure the position of the alignment points and providing coordinate data to the controller indicative of the measured position of the alignment points;

determining a first coordinate transformation based on the measured alignment point coordinates and storing said first coordinate transformation in the controller;

providing at least two local features on the workpiece;

providing nominal local feature coordinates to the controller indicative of the expected location in robot coordinates of the at least two local features on the workpiece;

applying the first coordinate transformation to the nominal local feature coordinates to provide corrected local feature coordinates and storing the corrected local feature coordinates in the controller;

positioning the robot in response to the corrected local feature coordinates to measure the actual position of the at least two local features on the workpiece and providing coordinate data to the controller indicative of the measured position of the at least two local features;

determining a second coordinate transformation based on a comparison of the nominal local feature coordinates and the measured local feature position and storing the second coordinate transformation in the controller;

providing nominal machine operation location coordinates to the controller indicative of the plurality of locations on the workpiece;

applying the second coordinate transformation to the nominal machine operation location coordinates to provide corrected machine operation location coordinates and storing the corrected machine operation location coordinates in the controller.

positioning the robot in response to the corrected machine operation location coordinates to perform the machine operation at the plurality of locations on the workpiece; and performing the machine operation at the plurality of locations on the workpiece.

2. A method for providing individualized robot response on a workpiece-by-workpiece basis according to claim 1, comprising:

altering the positions of the at least two local features on a workpiece-by-workpiece basis, while leaving the nominal local feature coordinates unchanged.

3. A method for accurately performing a machine operation at a plurality of collinear locations on a workpiece with a robot that is under the direction of a controller, that comprises:

mounting the workpiece in a predetermined manner to a fixture;

providing a plurality of alignment points on the fixture;

disposing the fixture to locate the workpiece within the robot's work envelope;

positioning the robot to measure the position of the alignment points and providing coordinate data to the controller indicative of the measured position of the alignment points;

determining a first coordinate transformation based on the measured alignment point coordinates and storing the first coordinate transformation in the controller;

providing at least two local features on the workpiece;

providing nominal local feature coordinates to the controller indicative of the expected location in robot coordinates of the at least two local features on the workpiece;

applying the first coordinate transformation to the nominal local feature coordinates to provide corrected local feature coordinates and storing the corrected local feature coordinates in the controller;

positioning the robot in response to the corrected local feature coordinates to measure the actual position of the at least two local features on the workpiece and providing coordinate data to the controller indicative of the measured position of the at least two local features;

determining a line equation based on the measured positions of the two local features and storing the line equation in the controller;

providing machine operation location data to the controller indicative of the number and spacing for the machine operations along the line for the plurality of collinear locations on the workpiece;

applying the machine operation location data to the line equation to provide machine operation location coordinates and storing the machine operation location coordinates in the controller;

positioning the robot in response to the machine operation location coordinates to perform the machine operation at the plurality of locations on the workpiece; and performing the machine operation at the plurality of collinear locations on the workpiece.

* * * * *